Figure 1:
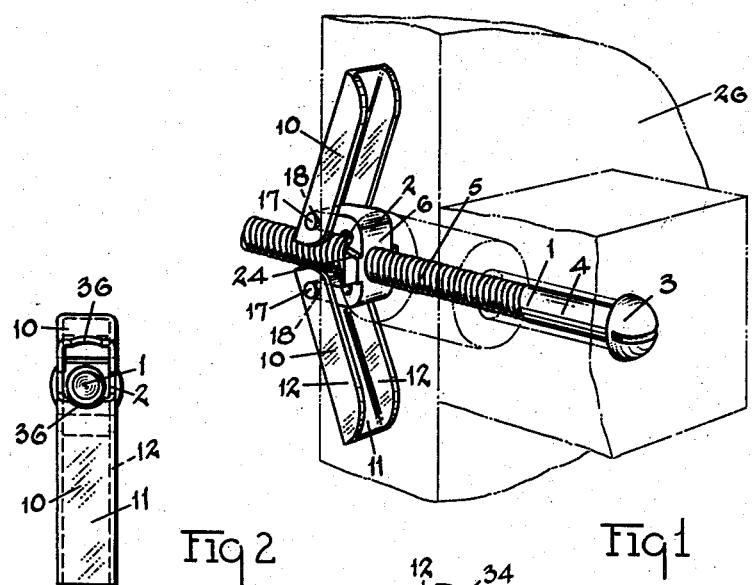

Dec. 3, 1940.  E. SAYEN ET AL  2,224,023

TOGGLE HEAD AND BOLT

Filed Sept. 19, 1938

Inventors
Emery Sayen
and Christian R. Webb
By Faust H. Crampton
Attorney

Patented Dec. 3, 1940

2,224,023

UNITED STATES PATENT OFFICE 2,224,023

TOGGLE HEAD AND BOLT

Emery Sayen and Christian R. Webb, Toledo, Ohio

Application September 19, 1938, Serial No. 230,538

6 Claims. (Cl. 85—3)

Our invention relates generally to fastening or engaging devices utilized for assembling separate elements to form an interjoined structure. The invention particularly relates to a fastening device commonly referred to as a toggle bolt fastener.

Our invention has for an object to provide a bolt and toggle head having a toggle part movably connected to a means movable relative to the head, the movement of said means operating to modify the effective connection between said toggle part and bolt and the connecting pressure exerted by the toggle part and bolt on the elements thereby connected. In this connection, our invention provides a toggle bolt fastening means whereby certain desired maximum connecting pressures may be established and forces acting independently of the toggle bolt, tending to vary the pressure thus desired, are automatically compensated for by counteraction of the toggle bolt parts. Thus, elements connected by the toggle bolt of our invention, are insured against fracture or looseness due to changing conditions of the elements or their surroundings, which would cause an increased pressure to be exerted between the elements or a reduced pressure to be exerted between the elements, if they were interconnected by toggle bolts heretofore commonly used.

Another object of our invention is to provide a toggle head having a toggle part which engages the shank of the bolt, used in conjunction therewith, with a force tending to lock the same against free rotation, but insufficient to crush the threaded portions thereof or shear the shank. This feature is of material importance when the toggle bolt is subjected to a load, which, when exerting, tends to produce a torque on the bolt, ofttimes rotating the bolt in a direction to disconnect the same from the head. In our invention, the increased tension of the load causes coincidental increased seizure of the bolt shank with a force sufficient to resist the torque but insufficient to deform or shear the bolt.

A further object of our invention is to provide a toggle head, which, when use of the same is no longer required in any one location, it may be easily retrieved. Thus, our invention promotes considerable economy in the use of fastening means of the toggle bolt type. A still further object of the invention is to provide a toggle bolt adaptable to a variety of uses by reason of its various refinements, notwithstanding its exceeding simplicity of parts and low cost of construction. Our toggle bolt may be used to advantage as a ground, wall, mortar, and slab anchor, as well as in other fields, the multiplicity of which those skilled in the art will readily appreciate.

The invention consists in other features and advantages which will appear from the following description and upon examination of the drawing. Structures containing the invention may partake of different forms and still embody the invention. To illustrate a practical application of the invention, I have selected a toggle head and bolt as an example of the various structures and details thereof that contain the invention and shall describe the selected structure hereinafter, it being understood that variations may be made without departing from the spirit of the invention. The particular structure selected is shown in the accompanying drawing and described hereinafter. This application is in continuation of our application Serial No. 183,033, filed January 3, 1938, for a Toggle bolt and abandoned September 19, 1938.

Figure 2:
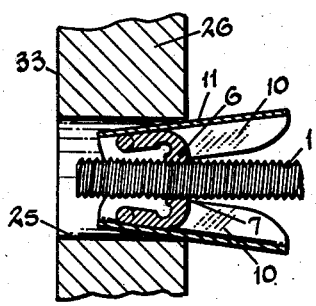
Figure 3:
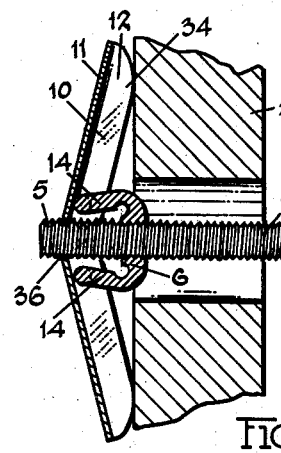
Figures 4, 5:
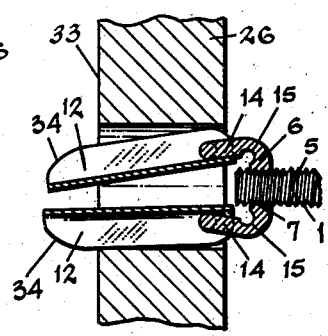
Figure 6:
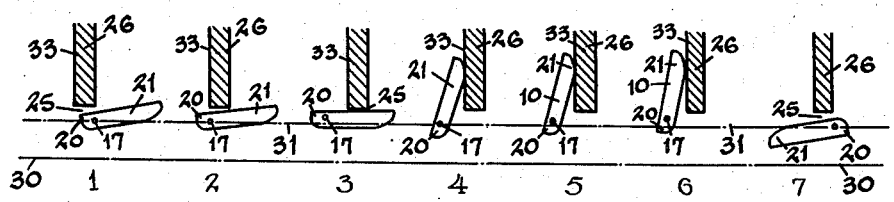

Fig. 1, of the accompanying drawing, illustrates a perspective view of a toggle head and bolt embodying the features of our invention, said toggle head and bolt being shown in assembled relation to structural elements interjoined thereby. Fig. 2 illustrates a view of the lead end of the toggle head and bolt illustrated in Fig. 1. Fig. 3 illustrates a view of a longitudinal section of the toggle head and bolt, shown in Fig. 1, showing the relation of the parts during insertion through an opening formed in a structural element. Fig. 4 illustrates a view of a longitudinal section of the toggle head and bolt shown in Fig. 1, showing the relation of the parts as the toggle head engages a structural element. Fig. 5 illustrates a view of a longitudinal section of the toggle head and bolt shown in Fig. 1, showing the relation of the parts during withdrawal of said toggle head from engagement with said structural element. Fig. 6 diagrammatically illustrates the various positions and relations of certain parts of the toggle head during performance thereof and is hereinafter referred to for convenience of explanation and clarity of understanding.

A toggle bolt embodying the features of our invention includes a combination of a bolt, such as the externally threaded member or bolt 1, and a toggle head 2. The bolt 1 may have the usual head 3, neck 4, and threaded shank 5. The toggle head 2 is carried by a member 6 having an annulus having an opening or port therethrough as an internally complementally threaded portion 7 adapted to threadably receive the shank 5 of the bolt 1 and, thus, move the member 6 relative to the bolt and dispose the same in any desired relative position.

The toggle head 2 has a toggle arm or part 10. Said toggle part 10 may be formed of metal, preferably, for reasons of economical production and structural strength and rigidity, shaped to have a crown 11 and depending side walls or flanges 12. Thus, the toggle part 10, when viewed in one position, may be said to be channel-shaped, a feature giving added traction when the toggle head is utilized as a ground anchor for stay cables and the like. The toggle part 10 is connected to the member 6 by a means which includes a part movable with reference to the member and on which the toggle part is mounted and a joint part characterized by the fact that it exerts a yielding resistance to the movement of the first-named part. In the U-shaped form of construction illustrated in the accompanying drawing, the first-named part is embodied in a leg part 14 and the said joint part is embodied in a resiliently flexible joint 15, which connects the leg 14 to the member 6.

The leg 14 extends from said joint 15, preferably, through a plane parallel to the axial line of the annulus portion 7 and in a direction leading the thread of said annulus portion 7. Means is provided for connecting said toggle part 10 to the leg 14. Such means, as the trunnions 17 formed on the leg 14 which extend through bearings 18 formed in the flanges 12, provide a convenient connecting means permitting substantially 180° angular movement of the toggle part 10 with reference to the leg 14. It will be noted that the bearing 18 is formed at a point intermediate the extremities or the functional ends, such as the leading end 20 and the trailing end 21, of the toggle part 10. Thus, the toggle part 10, in its relation to the trunnions 17, may be regarded as a simple lever, the trunnions 17 forming a fulcrum from which extend the lever arms, the leading and trailing ends 20 and 21 of the toggle part 10.

The joint 15 may be formed by tempering or by providing a metal of reduced thickness and greater resiliency than the parts connected thereto. The joint 15, while permitting the leg 14 to move with reference to the member 6, yieldingly resists said movement with a force that increases with the amplitude of displacement of said leg 14 from its normal position. Other corresponding means to the particular joint part 15 disclosed herein may be advantageously used with like effect. It will be noted that, as the leg 14 moves from its normal position, the trunnions 17, mounted on said leg, may be said to move radially with respect to the axis of the annulus portion 7 and, thus, the toggle part 10, connected to said trunnions, is translated radially with reference to said annulus axis.

For reasons that will appear hereinafter, the member 6 is provided with a shoulder part 24. The shoulder part 24 is located so as to be engaged by a flange 12 when the toggle part 10 is moved on its trunnions 17 to a position, such as that illustrated in Fig. 3 of the accompanying drawing. The shoulder part 24 normally supports the toggle part in a diverging relation to the axis of the annulus portion 7 to, thus, locate the leading end 20 more proximate to the axis of the annulus portion 7 than the trailing end 21. It is apparent that when the toggle head 2 is moved through an opening 25 in a wall 26, as shown in Fig. 3, the leading end 20 readily enters the opening but the trailing end 21 slidably engages the edges of the opening 25 with a pressure which resists further entrance of the head 2. The toggle part 10, particularly the trailing end 21, causes the toggle part to oscillate on the shoulder 24 moving the leg 14 against the resistance exerted at the joint 15 permitting the trailing end 21 to approach the axis of the annulus portion 7 sufficiently to enable continuation of passage of the toggle head 2 through the opening 25. The energy required to oscillate the toggle part 10 to enable complete insertion through the opening 25, is utilized to cause the trailing end 21 of the toggle part to move quickly away from the inner edge of the opening 25 immediately upon complete insertion of the head 2 through the opening.

Referring to Fig. 6 for further understanding of the above described action of insertion, the line 30 indicates the axial line of the annulus portion 7 and the line 31, extending parallel to said axial line 30, is a line of reference demonstrating the occurrence of displacement of the leg 14 and its trunnions 17 from normal position. The first step indicated in Fig. 6, shows the toggle part in its normal position ready for insertion and the trunnion 17, indicated by the small circle, is in its normal position on the reference line 31. In the second step, which substantially corresponds with the showing made in Fig. 3 of the drawing, insertion of the toggle head 2 has begun, the trunnion 17 and the leg 14 supporting the same, remaining in their normal positions. In the third step, the trailing end 21 of the toggle part has been engaged by the edges of the opening 25 and the trunnion 17 has diagrammatically moved from normal position on the line 31, thus indicating that the leg 14 has moved against the bias of the joint 15. The movement of the leg 14 is caused by the oscillation of the toggle part on the shoulder 24 in response to the movement of the trailing end 21 toward the axis of the annulus portion 7.

After the head has been inserted in the opening 25, the trailing end 21 of the toggle part is maintained by the shoulder 24 in a position to engage the surface surrounding the opening 25, such as the surface 33 of the structural element 26. The trailing end 21 is provided with a quadrant elliptical cam. Preferably, the edges of the flanges 12 of the trailing end 21 are cut, as at 34, to form said cam. Now, as the bolt is rotated or the toggle head drawn toward the surface 33 of the structural element 26, the cam 34 slidably engages said surfaces 33, causing the trailing end 21 of the toggle part to move angularly on the trunnions 17.

The angular movement of the toggle part 10, thus produced, causes the leading end 20 of the toggle part to angularly approach the axis of the annulus portion. Here it is to be noted that the toggle part 10 is provided with a surface which approximates the contour of the bolt shank 5 and the threading thereon. Said surface may be formed by an edge 36 formed on the crown 11 proximate to the leading end 20 of the toggle part. Thus, as the leading end 20 approaches the axis of the annulus portion 7, the bolt shank 5 is engaged and held in impinging as a lock nut against free rotation by said edge surface 36. The position of the toggle part 10, at this stage, is substantially illustrated in Fig. 4, and diagrammatically illustrated in the fourth step of Fig. 6.

Assuming that the bolt 1 is further rotated, the leading end 20 of the toggle part 10 being restricted by the bolt from further angular movement about the trunnion axis then established, exerts a force through the toggle part tending to translate the same in an endwise direction toward the trailing end 21. This force exerted on the trunnions 17, causes movement of the leg 14 in a direction which tends to relieve the congestion between the bolt and the leading end 20 and permits a slight further angular movement of the toggle part 10. This condition is diagrammatically illustrated in the fifth step of Fig. 6, wherein the trunnion 17 is diagrammatically shown displaced from the reference line 31. The leg 14 is, likewise, displaced, being subjected to the yielding resistance exerted at the joint 15. Thus, the pressure exerted between the bolt head 3 on an element and the toggle part on the surface 33 is modified by the movement of the leg 14 and the resistant resiliency to said movement exerted by the joint 15. If the structural element, to which the bolt is connected, or the element, on which the toggle part bears, changes, due to shrinkage, deformation or disintegration, so that the distance between points of engagement of the bolt head and toggle part with the elements becomes less after original securing, the leg 14 moves toward its normal position to swing the trailing end 21 closer to the bolt head and, thus, take up any looseness as might exist by reason of said change. If, however, the elements swell or vibrate so that the distance between said engagement points becomes greater, the leg 14 is capable of moving further from its normal position permitting the end 21 to swing further from the bolt head and, thus, relieve the strain on the elements as might produce fracture or deformation. The sixth step indicated in Fig. 6 illustrates, diagrammatically, the relation existing during the latter described condition. It will be noted that the variable and unpredictable effects on the elements will be largely absorbed by movement of the leg 14 and the joint 15.

When it is desired to discontinue the use of the toggle head, the bolt 1 is backed off from the member 6 until the bolt shank passes from the realm of engagement by the surface 36, whereupon the toggle part 10 may be moved angularly on its trunnions 17 approximately 180° from the inserting position thereof, shown in Fig. 3, to a position, such as that shown in Fig. 5 and illustrated, diagrammatically, in the seventh step of Fig. 6. The head 2 may, thereafter, be easily withdrawn from behind the element 26 and through the opening 25 to be retrieved for subsequent use.

If desired, the toggle head 2 may be provided with another toggle part 10 having a structure, functions and relation to other parts herein described similar to that already related. Preferably, the second toggle head is located on a leg 14, which is supported in diametric relation to the already described leg 14, with respect to the axis of said annulus portion 7 to produce balanced effects to the forces exerted endwise by the bolt 1.

While in accordance with the provisions of the statutes, we have illustrated and described the best form of our invention now known to us, those skilled in the art will readily understand that many changes may be made in the form of construction disclosed, without departing from the spirit of our invention as set forth in the appended claims.

We claim:

1. An engaging device for an externally-threaded member, including an internally-complementally-threaded body provided with a leg having yieldable connection with the body, said leg extending from the body laterally of and along the member, and an arm having pivot bearing connection with the leg adjacent the free end of the leg and adapted for swinging to thrust against the member and shift the free end of the arm relatively to the body and member.

2. An engaging device for an externally-threaded member, including an internally-complementally-threaded body provided with a leg having yieldable connection with the body and extending therefrom laterally of and along the member, and an arm having pivot bearing connection with the leg adjacent the free end of the leg and adapted for swinging from approximate parallelism with the member in one direction to approximate parallelism with the member in the opposite direction.

3. An engaging device for an externally-threaded member, including an internally-complementally-threaded body provided with a leg having yieldable connection with the body and extending therefrom laterally of and along the member, and a channel arm having pivot bearing connection with the leg adjacent the free end of the leg and adapted for swinging the channel concave side from toward the member to away from the member.

4. An engaging device for an externally-threaded member, including an internally-complementally-threaded body provided with a leg having yieldable connection with the body and extending therefrom laterally of and along the member, and a channel arm having pivot bearing connection with the leg adjacent the free end of the leg, said yieldable connection mounting the leg for swinging away from the member in resisting shifting of the arm concave side toward parallelism with the member.

5. An engaging device for an externally-threaded member consisting of two channel arms, and a connecting U-shaped body portion having approximately parallel leg portions from an intermediate return bend portion having an internally threaded port therethrough, said leg portions having yieldable connection with the return bend portion and the free ends of said leg portions having pivot bearing connections with the channel arms.

6. An automatic lock nut unit for an externally-threaded member comprising an internally-threaded body, there being similarly extending parallel leg means therefrom having yieldable connection with the body, and lever arm means having pivot bearing connection with the free end portion of the leg means for wedge impinging with the member as thrust by the leg means.

EMERY SAYEN.
CHRISTIAN R. WEBB.